US010664452B2

(12) United States Patent
Abrashkevich et al.

(10) Patent No.: US 10,664,452 B2
(45) Date of Patent: *May 26, 2020

(54) PARALLEL PROCESSING OF LARGE DATA FILES ON DISTRIBUTED FILE SYSTEMS WITH DYNAMIC WORKLOAD BALANCING

(71) Applicant: International Business Machines Corporation, Armonk, NY (US)

(72) Inventors: Alexander Abrashkevich, Richmond Hill (CA); Toni Kunic, Toronto (CA); Steven Raspudic, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 743 days.

This patent is subject to a terminal disclaimer.

(21) Appl. No.: 15/400,113

(22) Filed: Jan. 6, 2017

(65) Prior Publication Data

US 2017/0116222 A1    Apr. 27, 2017

Related U.S. Application Data

(63) Continuation of application No. 14/866,966, filed on Sep. 27, 2015, now Pat. No. 10,140,313.

(51) Int. Cl.
*G06F 16/18* (2019.01)
*G06F 9/50* (2006.01)
(Continued)

(52) U.S. Cl.
CPC .......... *G06F 16/1858* (2019.01); *G06F 3/061* (2013.01); *G06F 3/067* (2013.01);
(Continued)

(58) Field of Classification Search
CPC .......... G06F 16/24554; G06F 16/1858; G06F 16/182; G06F 16/1774; G06F 16/1827;
(Continued)

(56) References Cited

U.S. PATENT DOCUMENTS 8,180,747 B2    5/2012    Marinkovic et al.
8,352,710 B2    1/2013    Bell, Jr. et al.
(Continued)

FOREIGN PATENT DOCUMENTS

WO    2013151221 A1    10/2013
WO    2013153029 A1    10/2013

OTHER PUBLICATIONS

IBM: List of IBM Patents or Patent Applications Treated as Related, 2 pg.

(Continued)

*Primary Examiner* — Jay A Morrison
*Assistant Examiner* — Ken Hoang
(74) *Attorney, Agent, or Firm* — Cuenot, Forsythe & Kim, LLC

(57) ABSTRACT

Parallel processing files on a distributed file system, responds to a request to process the file, by partitioning the file into a set of predetermined sized blocks by a single coordinator and assigns blocks to a reader in a set of readers. Block assignments are recorded to a control table accessible to all readers. The set of readers search the control table for a row assigned to a respective reader. Responsive to locating the row, the respective reader changes a state of the row to in progress updating an associated timestamp. The respective reader scans the control table for an available set of the blocks, when all blocks currently assigned are exhausted and dynamically re-assigns an available block from another owning reader to itself and changes ownership to itself. When no rows are available, the respective reader completes processing and returns an end of file indication to the single coordinator.

6 Claims, 15 Drawing Sheets

(51) Int. Cl.
*G06F 16/182* (2019.01)
*G06F 16/176* (2019.01)
*G06F 16/2455* (2019.01)
*G06F 3/06* (2006.01)
*H04L 12/26* (2006.01)

(52) U.S. Cl.
CPC .......... *G06F 3/0643* (2013.01); *G06F 9/505* (2013.01); *G06F 16/1774* (2019.01); *G06F 16/182* (2019.01); *G06F 16/1827* (2019.01); *G06F 16/24554* (2019.01); *H04L 43/0876* (2013.01)

(58) Field of Classification Search
CPC . G06F 3/06; G06F 3/061; G06F 9/505; H04L 43/0876
USPC ..... 707/E17.032, E17.01, E17.005, 999.003, 707/E17.108, 999.001, E17.017, 999.1, 707/999.101, E17.001, E17.002, E17.006, 707/E17.014, E17.044, E17.046, E17.054, 707/E17.074, 604, 613, 634, 713, 715, 707/737, 741, 770, 803, 807, 999.002, 707/999.005, 999.01, 999.2; 709/231, 709/203, 213, 219, 220, 235, 236; 711/170, E12.017, E12.019, 103, 104, 711/114, 119, E12.001, E12.006, 711/E12.029, E12.033, E12.037, 122, 711/128, 129, 133, 135, 137, 141, 144, 711/145, 147, 152, 159, 168, 173, 203
See application file for complete search history.

(56) References Cited

U.S. PATENT DOCUMENTS

| | | | |
|---|---|---|---|
| 8,543,596 | B1 | 9/2013 | Kostamaa et al. |
| 10,140,313 | B2 | 11/2018 | Abrashkevich et al. |
| 2005/0203973 | A1 | 9/2005 | Yagawa |
| 2006/0174101 | A1 | 8/2006 | Bluhm et al. |
| 2011/0302583 | A1 | 12/2011 | Abadi et al. |
| 2012/0078844 | A1 | 3/2012 | Kim |
| 2013/0227558 | A1 | 8/2013 | Du et al. |
| 2015/0032759 | A1 | 1/2015 | Lee et al. |
| 2015/0134626 | A1 | 5/2015 | Theimer et al. |
| 2017/0091217 | A1 | 3/2017 | Abrashkevich et al. |

OTHER PUBLICATIONS

Abrashkevich et al., "Parallel Processing of Large Data Files on Distributed File Systems With Dynamic Workload Balancing", U.S. Appl. No. 14/866,966 , filed Sep. 27, 2015, 57 pages (a copy is not provided as this application is available to the Examiner.
Abrashkevic et al., "Parallel Processing of Large Data Files on Distributed File Systems With Dynamic Workload Balancing", U.S. Appl. No. 16/199,181, filed Nov. 25, 2018, 57 pages (A copy is not provided as this application is available to the Examiner.
Sakthisri, T. et al., "Balancing Blocks for Distributed File System in Clouds by Using Load Rebalancing Algorithm," In. Proc. of Int'l. Conf. on Information Systems and Computing (ICISC 2013), 2013, retrieved from the Internet: <http://www.ijetae.com/files/Conference%20ICISC-2013/IJETAE_ICISC_0113_37.pdf>, 4 pg.

FIG. 2
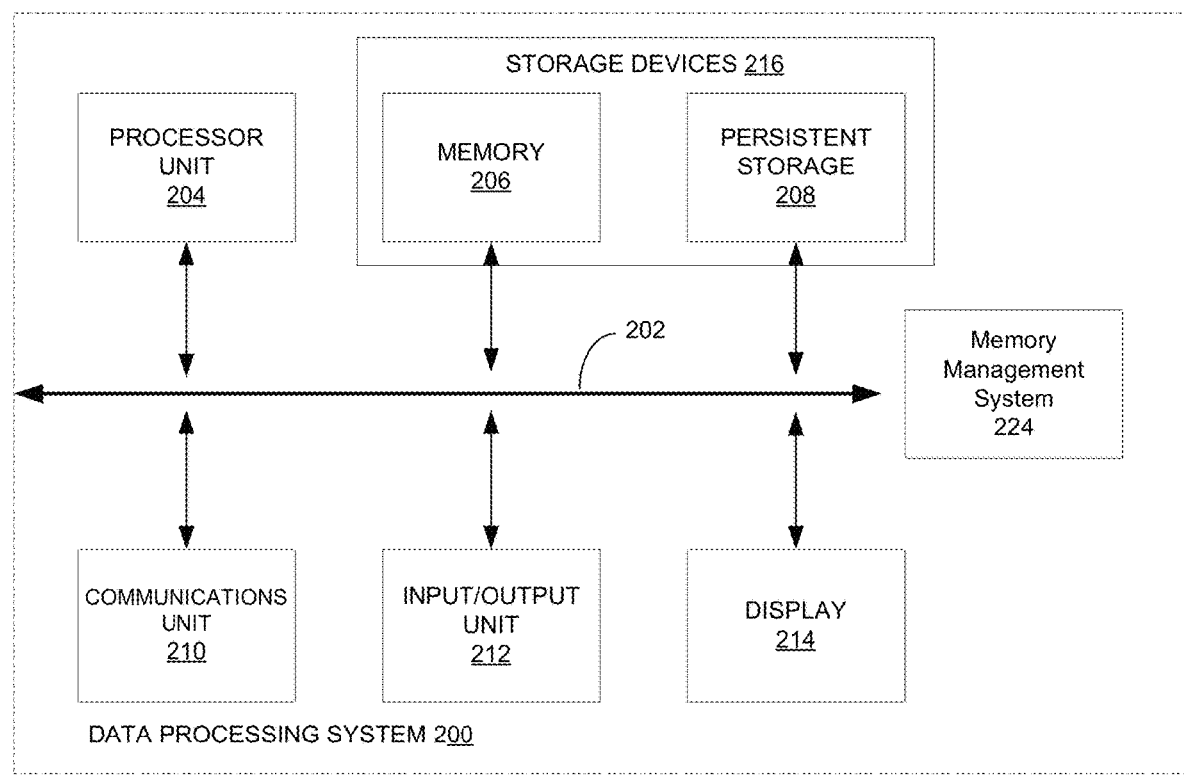
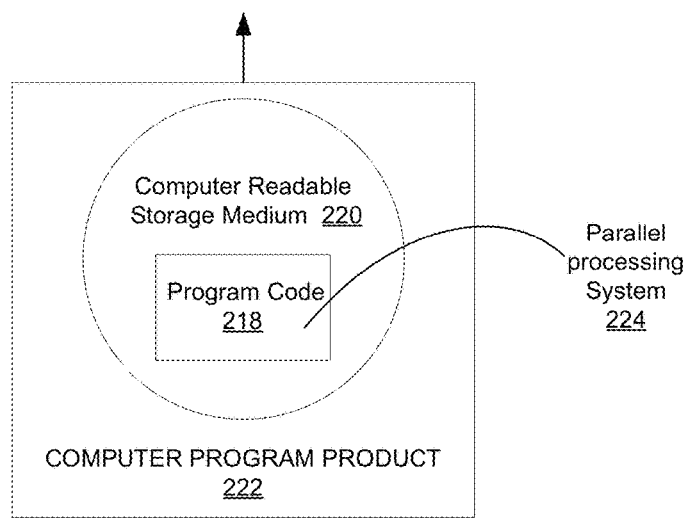

FIG. 12

Table 1202

| Block Number | Offset | Block Size | Owner Engine | Status | Timestamp |
|---|---|---|---|---|---|
| Block 0 | 0 | 1024 | Engine 1 | processed | |
| Block 1 | 1024 | 1024 | Engine 2 | processed | |
| Block 2 | 2048 | 1024 | Engine 1 | in progress | |
| Block 3 | 3072 | 1024 | Engine 3 | processed | |
| Block 4 | 4096 | 1024 | Engine 2 | in progress | |
| ... | ... | ... | ... | ... | ... |
| Block N | File Size - 1024 | 1024 | Engine 2 | in progress | |

1208

⬇ Fragmentation 1204

Table 1206

| Block Number | Offset | Block Size | Owner Engine | Status | Timestamp |
|---|---|---|---|---|---|
| Block 0 | 0 | 1024 | Engine 1 | processed | |
| Block 1 | 1024 | 1024 | Engine 2 | processed | |
| Block 2 | 2048 | 256 | Engine 1 | in progress | |
| Block 3 | 3072 | 1024 | Engine 3 | processed | |
| Block 4 | 4096 | 1024 | Engine 2 | in progress | |
| ... | ... | ... | ... | ... | ... |
| Block N | File Size - 1024 | 1024 | Engine 2 | in progress | |
| Block N + 1 | 2304 | 256 | Engine 1 | unprocessed | |
| Block N + 2 | 2560 | 256 | Engine 1 | unprocessed | |
| Block N + 3 | 2816 | 256 | Engine 1 | unprocessed | |

1210

PARALLEL PROCESSING OF LARGE DATA FILES ON DISTRIBUTED FILE SYSTEMS WITH DYNAMIC WORKLOAD BALANCING

BACKGROUND

1. Technical Field

This disclosure relates generally to processing of large data files in a data processing system and more specifically to parallel processing of large data files on Distributed File Systems (DFS) using dynamic workload balancing in the data processing system.

2. Description of the Related Art

An increasing interest in the data processing fields of Big Data and business analytics typically requires the use of efficient methods for reading and processing of large data files stored on Distributed File Systems. Optimized methods to improve the efficiency of reading and processing large data files is an important task and focus of recent developments in cloud computing and Big Data applications. A current simple explanation of big data may be "Big data is an all-encompassing term for any collection of data sets so large and complex that it becomes difficult to process them using traditional data processing applications." as defined at wikipedia.org. Business analytics, in comparison with business intelligence, is also defined at wikipedia.org as "Business analytics focuses on developing new insights and understanding of business performance based on data and statistical methods. In contrast, business intelligence traditionally focuses on using a consistent set of metrics to both measure past performance and guide business planning, which is also based on data and statistical methods."

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

SUMMARY

According to one embodiment, a method for parallel processing of files on a distributed file system may include, in response to a request to process as input a file stored on a distributed file system, a single coordinator of data scanning and processing services partitioning, using a processor, the file into a set of predetermined sized blocks; assigning, using the processor, one or more blocks in the set of predetermined sized blocks by the single coordinator to a reader in a set of readers; recording, using the processor, block assignments by the coordinator to a control table accessible to all readers; and accessing, using the processor, the control table by the set of readers to search the control table for a row currently assigned to a respective reader. The method may also include, in response to locating the row currently assigned to the respective reader, the respective reader changing a state of the row to "in progress", and updating a timestamp associated with the row in the control table using the processor; in response to a determination all blocks currently assigned to the respective reader are exhausted, the reader, using the processor, scanning the control table for a set of the blocks available, and dynamically re-assigning an available block from another owning reader to the respective reader using a set of predefined heuristics and changing the row owner to the respective reader; and, in response to a determination no rows are available, the respective reader completes processing and returns an end of file indication to the single coordinator.

According to another embodiment, a computer program product for parallel processing of files on a distributed file system may include a computer recordable device containing computer executable program code stored thereon. The computer recordable device may include computer executable program code in response to a request to process as input a file stored on a distributed file system, a single coordinator of data scanning and processing services for partitioning the file into a set of predetermined sized blocks; computer executable program code for assigning one or more blocks in the set of predetermined sized blocks by the single coordinator to a reader in a set of readers; computer executable program code for recording block assignments by the coordinator to a control table accessible to all readers; and computer executable program code for accessing the control table by the set of readers to search the control table for a row currently assigned to a respective reader. The computer recordable device may include computer executable program code in response to locating the row currently assigned to the respective reader, for changing a state of the row by the respective reader to "in progress", and for updating a timestamp associated with the row in the control table; computer executable program code in response to a determination all blocks currently assigned to the respective reader are exhausted, for scanning the control table by the reader for a set of the blocks available, and for dynamically re-assigning by the reader an available block from another owning reader to the respective reader using a set of predefined heuristics and changing the row owner to the respective reader; and, computer executable program code in response to a determination no rows are available, for completing processing and returning an end of file indication by the respective reader to the single coordinator.

According to another embodiment, an apparatus for parallel processing of files on a distributed file system may include a processor programmed to initiate executable operations. The executable operations may include, in response to a request to process as input a file stored on a distributed file system, partitioning the file by a single coordinator of data scanning and processing services into a set of predetermined sized blocks; assigning one or more blocks in the set of predetermined sized blocks by the single coordinator to a reader in a set of readers; recording block assignments by the coordinator to a control table accessible to all readers; and accessing the control table by the set of readers to search the control table for a row currently assigned to a respective reader. The executable operations may also include, in response to locating the row currently assigned to the respective reader, changing a state of the row to "in progress", and updating a timestamp associated with the row in the control table by the respective reader; in response to a determination all blocks currently assigned to the respective reader are exhausted, scanning the control table for a set of the blocks available, by the reader and dynamically re-assigning an available block by the reader from another owning reader to the respective reader using a set of predefined heuristics and changing the row owner to the respective reader; and, in response to a determination no rows are available, completing processing by the respective reader and returning an end of file indication to the single coordinator.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 2 is a block diagram of an exemplary data processing system operable for various embodiments of the disclosure;

FIG. 12 is a block diagram of block fragmentation operable for various embodiments of the disclosure;

DETAILED DESCRIPTION

Figure 1:
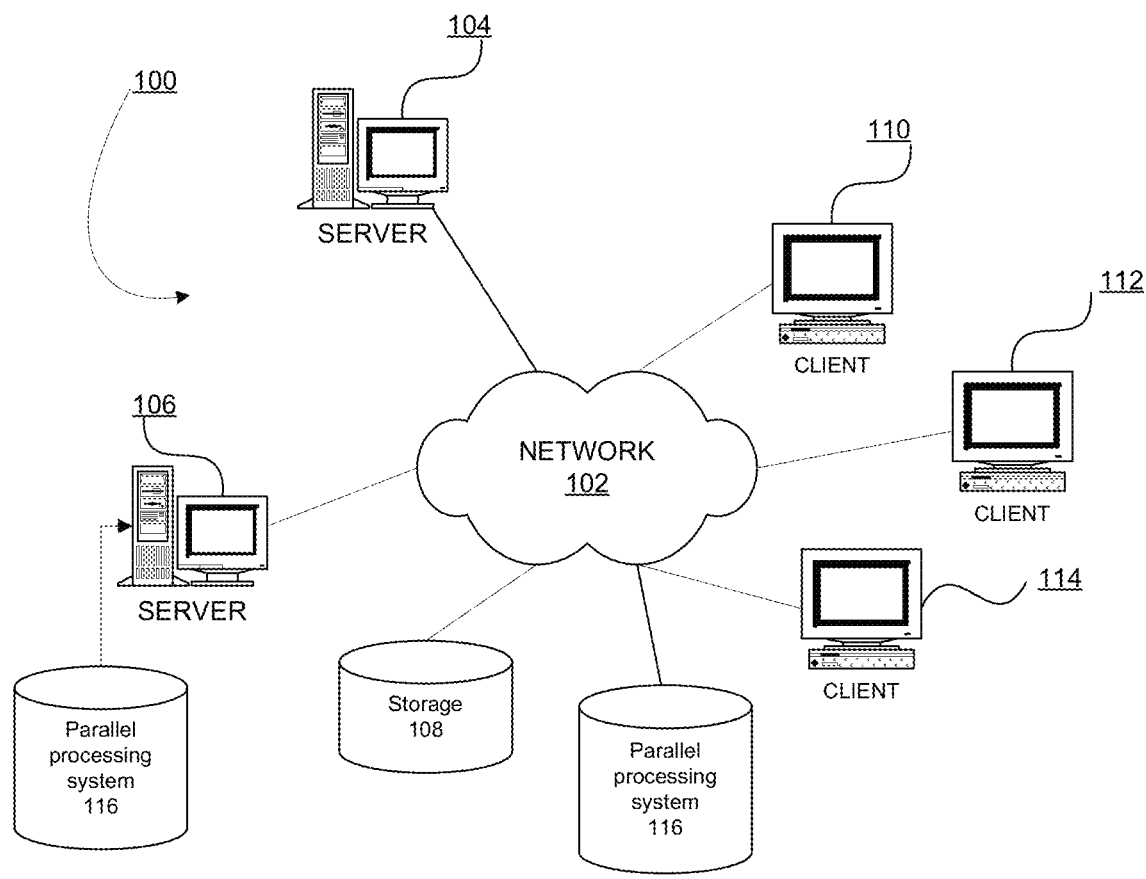
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied in which the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which the illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. Parallel processing system 116 may be downloadable, in the form of code suitable for execution when deployed on any number of server 104 or server 106. Server 106 is also shown as having parallel processing system 116 implemented at the location as an executable embodiment of the parallel processing system. Parallel processing system 116 is an embodiment of the disclosed system for parallel processing of large data files on Distributed File Systems using dynamic workload balancing in a data processing system, such as server 106.

In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Parallel processing system 224 may be downloadable, in the form of program code 218, suitable for execution when deployed on any number of data processing systems including data processing system 200. Parallel processing system 224 may also be in another embodiment as shown currently implemented on data processing system 200. Data processing system 200 is shown as having parallel processing system 224 implemented at the location as an executable embodiment of the disclosed system for parallel processing of large data files on Distributed File Systems using dynamic workload balancing in a data processing system, such as data processing system 200.

Using data processing system 200 of FIG. 2 as an example, an apparatus for parallel processing of files on a distributed file system is presented. The apparatus comprises a communications fabric 202; memory 206 connected to the communications fabric, wherein the memory contains computer executable program code 218; communications unit 210 connected to the communications fabric; input/output unit 212 connected to the communications fabric; display 214 connected to the communications fabric; and processor unit 204 connected to the communications fabric.

Processor unit 204 executes the computer executable program code to direct the apparatus, in response to a request to process as input a file stored on a distributed file system, to partition the file by a single coordinator of data scanning and processing services into a set of predetermined sized blocks. Processor unit 204 executes the computer executable program code to direct the apparatus to assign one or more blocks in the set of predetermined sized blocks by the single coordinator to a reader in a set of readers and to record block assignments by the coordinator to a control table accessible to all readers.

Processor unit 204 further executes the computer executable program code to direct the apparatus to access the control table by the set of readers to search the control table for a row currently assigned to a respective reader and in response to locating the row currently assigned to the respective reader, to change a state of the row to "in progress", and to update a timestamp associated with the row in the control table by the respective reader. Further in response to a determination all blocks currently assigned to the respective reader are exhausted, processor unit 204 executes the computer executable program code to direct the apparatus to scan the control table for a set of the blocks available, by the reader and to dynamically re-assign an available block by the reader from another owning reader to the respective reader using a set of predefined heuristics and change the row owner to the respective reader. In response to a determination that no rows are available, processor unit 204 further executes the computer executable program code to direct the apparatus to complete processing by the respective reader and to return an end of file indication to the single coordinator.

Figure 3:
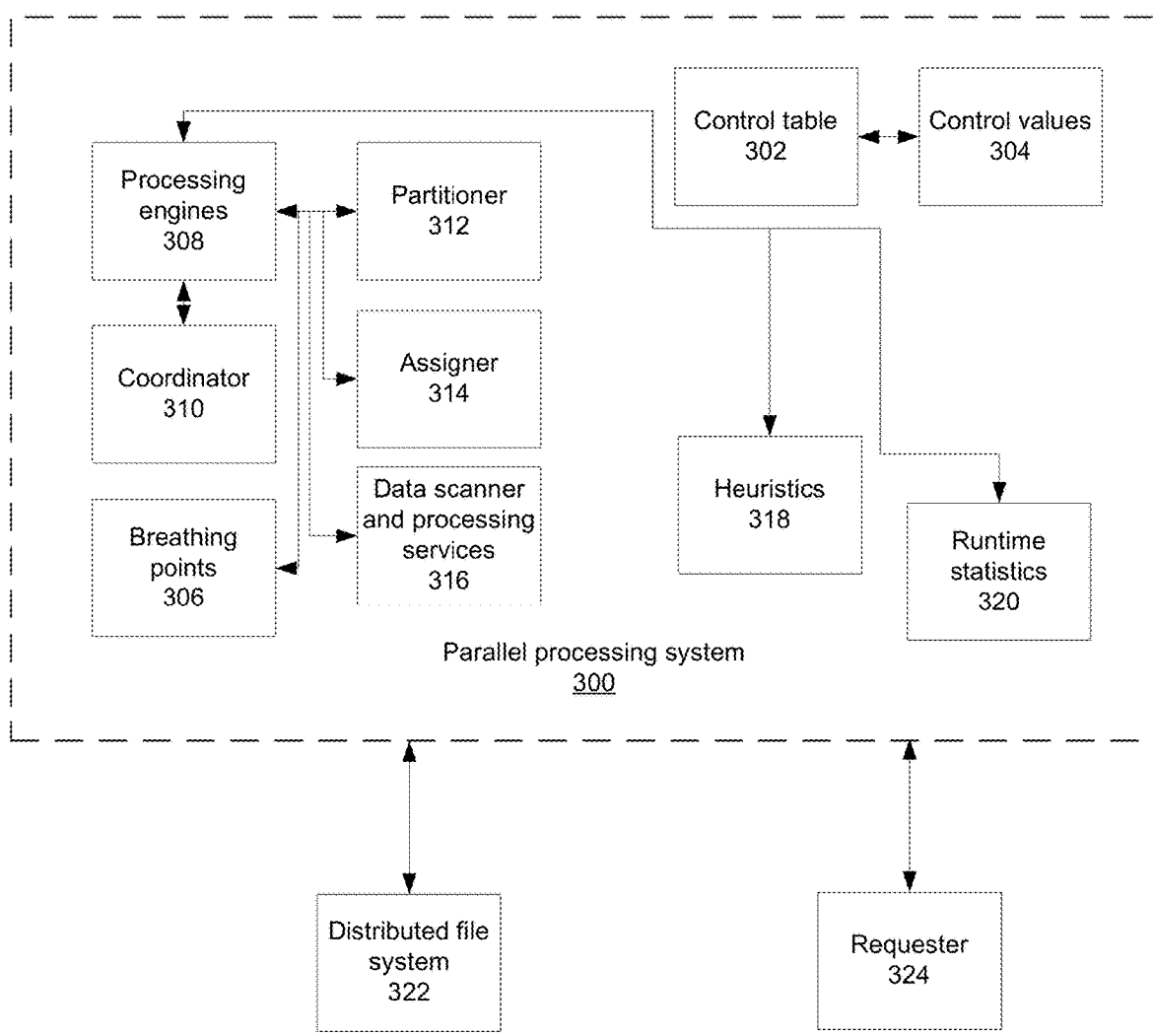
FIG. 3 is a block diagram representation of a parallel processing system operable for various embodiments of the disclosure.

With reference to FIG. 3, a block diagram of a parallel processing system operable for various embodiments of the disclosure is presented. Parallel processing system 300 provides a capability for parallel processing of large data files on Distributed File Systems using dynamic workload balancing in a data processing system, such as data processing system 200 of FIG. 2.

Parallel processing system 300 comprises a number of functional components which when implemented on a data processing system enhance the previous capabilities of the data processing system to provide additional capabilities for parallel processing of large data files on Distributed File Systems using dynamic workload balancing in the data processing system. The example provided is only an example and is provided without limitation as to various equivalent combinations of functional components. The functional components depicted may be implemented in one embodiment as a set of functional components and in another embodiment as combinations of functional components without departing from the overall disclosed functional capabilities.

Parallel processing system 300 comprises functional components including control table 302, control values 304, breathing points 306, processing engines 308, coordinator 310, partitioner 312, assigner 314, data scanner and processing services 316, heuristics 318, and runtime statistics 320. Distributed file system 322 and requester 324 are external elements to parallel processing system 300 but are interdependent.

Control table 302 is a data structure maintained to have one row per block of a distributed file being processed. Control values 304 are maintained for each row on control table 302. The control values enable tracking, for each block, a block number as an identifier; an offset of the beginning of the particular block to identify a location of the block; a block size for the particular block; an owner engine indicating which processing engine is assigned the particular block; a status value indicating a block processing state as one of in progress, unprocessed, and completed; a timestamp containing a start time at which the block began being processed and a breathing point flag indicating, when set, a respective processing engine is to pause to perform a re-fragment or re-assign associated with the respective block. Additional columns may be defined containing additional run time statics.

Breathing points 306 define one or more logical fragments within a block of data assigned for processing. Breathing points 306 indicate a set point in processing of a respective block at which a respective processing engine is to pause to perform a re-fragment or re-assign associated with the respective block. Breathing points 306 are internal to the processing of parallel processing system 300 and are not externalized.

Processing engines 308 provides a capability to process assigned blocks of the distributed file. Processing engines 308 are responsible, for a currently assigned block, to partition, using logic supplied by partitioner 312, and to assign blocks as required using assigner 314. A particular one of processing engines 308 may be predefined as coordinator 310, or the function of coordinator 310 may be determined dynamically at run time. Only a single coordinator is needed. Processing engines 308 further use data scanner and processing services 316 in actual processing of respectively assigned data blocks. Processing engine is a term used interchangeably throughout the disclosure with processing machine, reader, and PE.

In one embodiment processing engines 308 may incorporate all of the functionality just described while in another embodiment may implement a number of discrete callable services as required for a particular installation. Partitioner 312 provides a capability to fragment a file into a number of sized blocks. In particular, partitioner 312 fragments a given distributed file into substantially equal sized blocks initially and upon request can further re-fragment blocks into sub-block fragments. Assigner 314 provides a capability to perform an initial assignment of the blocks of the initially fragmented distributed file to each of processing engines 308. During processing of the blocks by processing engines 308, assigner 314 may be called to re-assign the sub-block fragments as a result of re-fragmenting some number of the initial blocks into associated sub-block fragments. Assigner 314 typically determines an assignment using a locality of reference to ensure data blocks closest to a particular processing engine is selected for the particular processing engine.

Heuristics 318 provides a capability to maintain a historical perspective of, and accordingly analyze, statistical information associated with the processing of the blocks by each of processing engines 308. Runtime statistics 320 is similar to heuristics 318, however in this case the information is dynamically collected at run time. Heuristics 318 captures information associated with control values 304, as does runtime statistics 320. Information collected includes data comprising network bandwidth, I/O throughput, I/O latency, block processing state and processing engine processing times. Locality of reference pertaining to data location with respect to processing engines is also another example of a heuristic used in parallel processing system 300.

Distributed file system 322 represents the repository of data comprising one or more data files. A selected one or more data files is to be processed by processing engines 308 according to a request received by parallel processing system 300 from one or more or requesters 324. Requester 324 may be an automaton or a human user.

Figure 4:
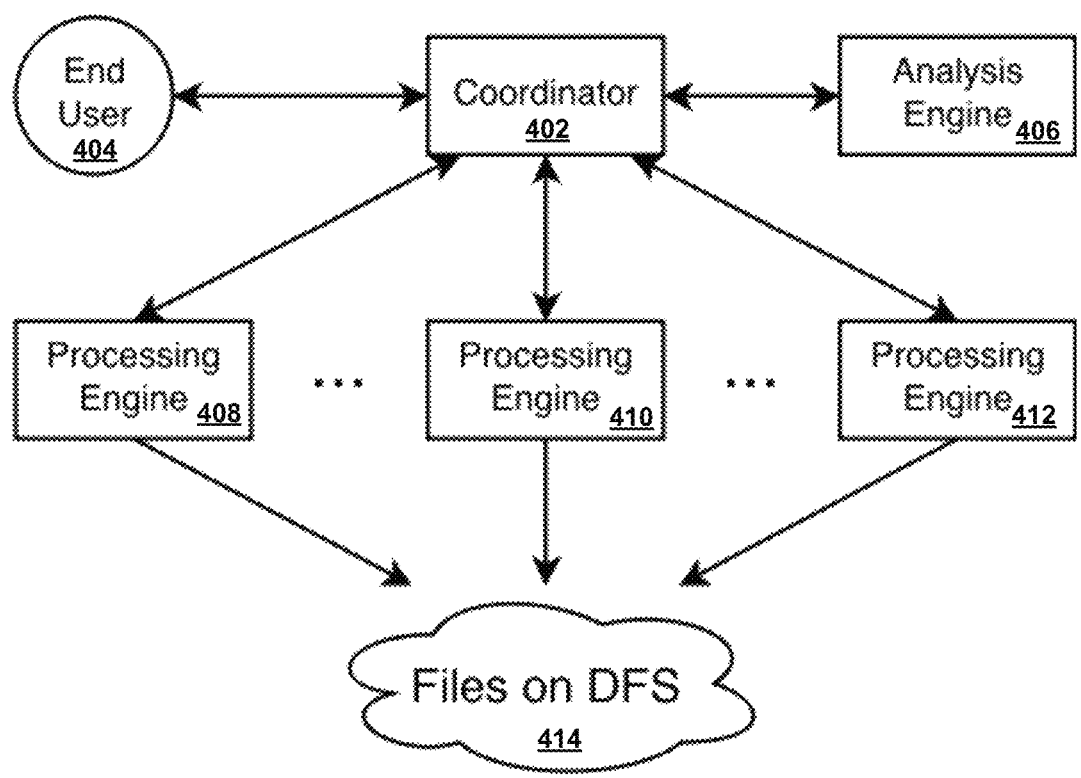
FIG. 4 is a block diagram of a coordinator running processing engines operable for various embodiments of the disclosure.

With reference to FIG. 4 a block diagram of a coordinator running processing engines operable for various embodiments of the disclosure is presented. DFS environment 400 is an example of parallel processing to collect data from files on DFS 414.

Embodiments of the disclosure describe typical scanning and processing of large data files along with relatively low cost dynamic workload balancing. Embodiments of the disclosure differ from previous solutions because the embodiments do not require any network access to read blocks and typically require little to no control traffic between compute nodes in a cluster.

Embodiments of the disclosure are directed toward efficient parallel processing of files on DFS 414. Therefore a coordinator 402 (single control point) of data scanning and processing services which initiates a request to scan and parse a set of files, receives, aggregates and analyzes the data and then returns a desired output to end user 404 or an application. For example, and without limitation, coordinator 402 may be an analysis engine 406 for a business intelligence tool or an application, web services for various applications handling requests for Big Data processing, or relational 'shared nothing' databases on a cluster of computer nodes.

After receiving a request to process large data files stored on DFS 414, there is a need to read the large data files as efficiently as possible. Usually this is accomplished by running in parallel a set of readers 408-412 or processing engines (PE) 408-412 to read files on DFS 414 or required parts of the files depending on how file processing is organized and passed to a requestor for aggregation and further analysis when required.

In typical existing techniques using dynamic workload balancing, a sampling of network traffic within a cluster or a preliminary step of measuring network performance including bandwidth, and I/O is required to generate initial block splits for large files. Examples of these techniques include methods using a maximum flow network problem algorithm, or similar algorithm, to represent blocks of the files on DFS for faster processing. However embodiments of the disclosure do not require an initial sampling phase as required in previous techniques.

Figure 5:
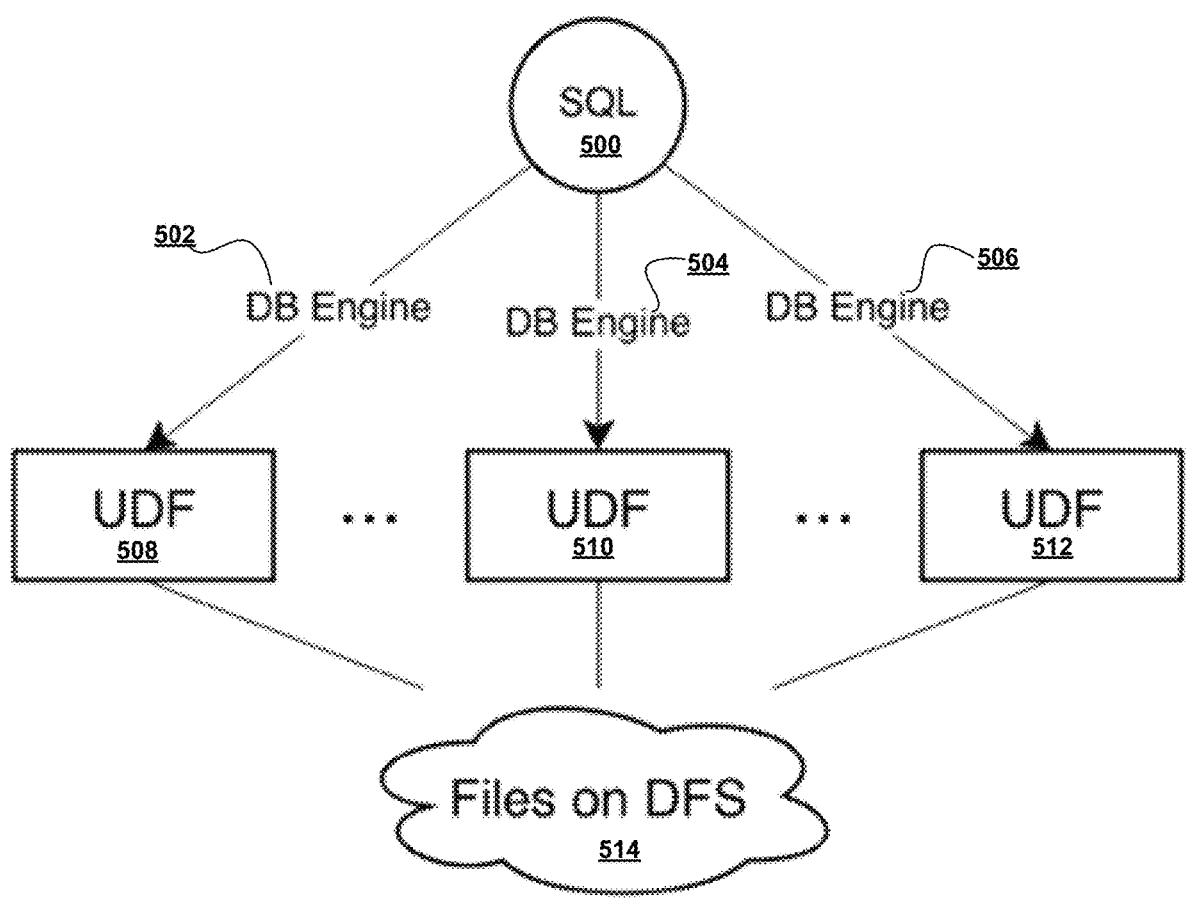
FIG. 5 is a block diagram of a relational database with data partitioning operable for various embodiments of the disclosure.

With reference to FIG. 5 a block diagram of a relational database with data partitioning operable for various embodiments of the disclosure is presented.

Embodiments of the disclosure typically use a distributed relational database as an example of the previously stated coordinator 402 of FIG. 4. The example is not limited and can be applied to an application or a tool requiring parallel processing of large files on DFS.

Relational databases allow extensibility via mechanisms such as user-defined functions (UDFs) 508-512. UDF's 508-512 are a flexible mechanism which allows relational tables to be logically constructed from any type of input data which can be parsed and mapped into a relational table.

In this example, the input data resides on a file system, DFS 514. DFS 514 is accessible to all UDFs 508-512 (which read the data). UDFs 508-512 work in parallel to process external data residing on DFS 514, which is accessible to all UDFs 508-512. UDFs 508-512 may reside on one or more operating system instance hosts.

Initiating and controlling the process is structured query language (SQL) statement 500 issued to relational database engines 502-506. SQL statement 500 references the named UDF, and that object is treated as a relational table in all queries. A single file can be processed with a single UDF reader in a linear fashion. That is, data is read linearly from the file and the data is processed and returned as rows in a relational table. However there is no requirement to return the data in a particular order. Any aggregation or ordering is done at the level of the coordinator, which applies ordering and aggregating operations as specified in the SQL query.

Figure 6:
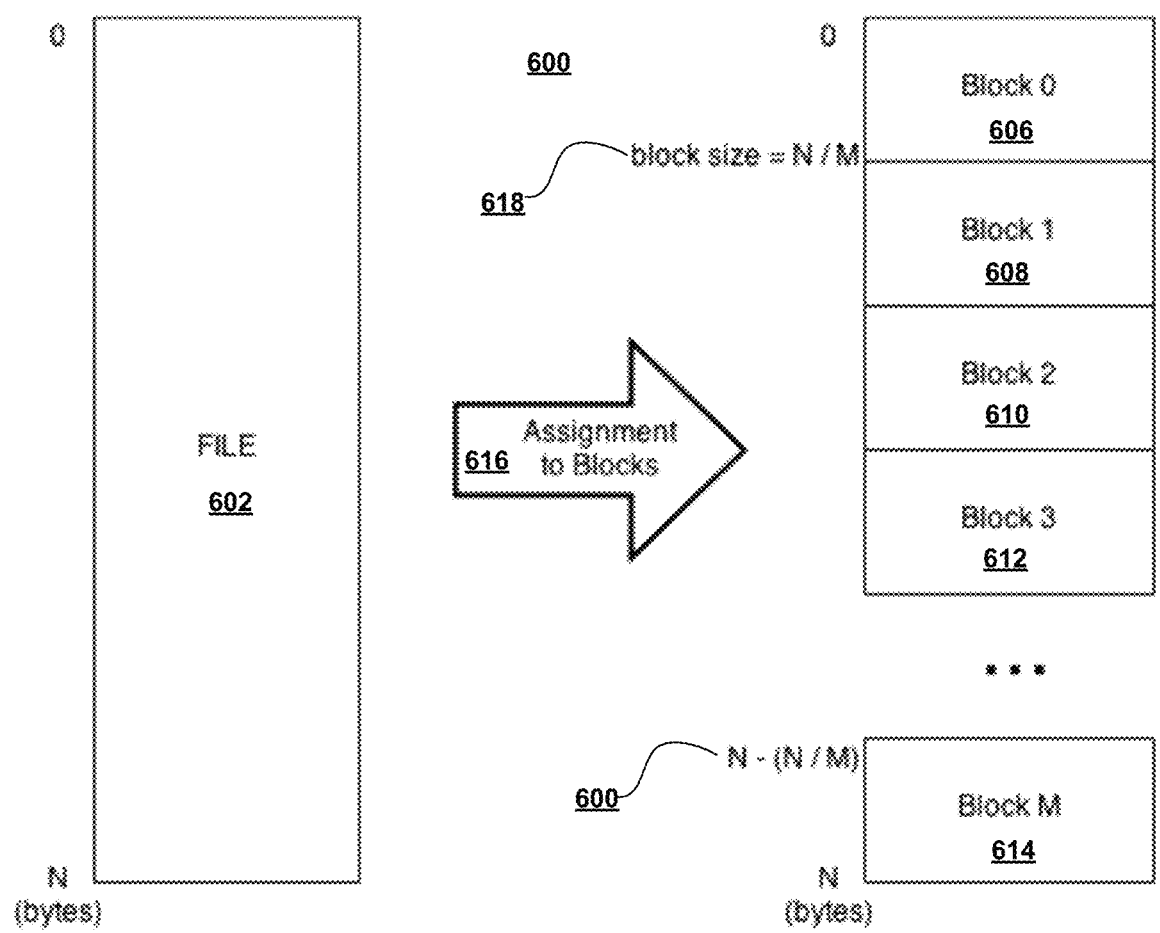
FIG. 6 is a block diagram of partitioning of a file into blocks operable for various embodiments of the disclosure.

With reference to FIG. 6 a block diagram of partitioning of a file into blocks operable for various embodiments of the disclosure is presented.

To process large files efficiently, embodiments of the disclosure use a partitioning approach. Partitioning the file is designed to separate the data file into a set of equal sized byte ranges, or 'blocks.' Block partitioning 600 is an example of a process used to separate file 602 into collection 604 of equal sized block 0 606 through block M 614 for processing. File 602 on DFS is sized from 0 to N bytes, wherein N is the count of bytes. Assignment to blocks 616 represent a data services process used to separate file 602 into a predetermined number and size of blocks in collection 604.

Block size 618 is expressed as N/M, where N is the count of bytes and M is the total number of blocks. When file 602 is not an exact multiple of the block size, then the last block is made smaller by an expected amount (for example, file size modulo block size). All other blocks are of equal size.

Each block is assigned to a reader, as part of Processing Engine 408 of FIG. 4. The union of the set of all blocks of all readers is equal to the set of all blocks that constitute the original file. In this example, block 606 to block 614, when combined, have a total of N bytes, which is the same size as the original file. There is no overlap among blocks. That ensures that data in file 602 is seen exactly once, and by exactly one reader.

An initial or default block size may be the current block size of the file system, estimated as the file size being processed/number of processing engines in the cluster or another estimate suitable to a particular implementation. The block size used, whether as calculated or some predetermined value, should not result in a block size less than the current block size of the file system. Each of the readers proceeds to process a subset of data in the file independently (one or more blocks), and constructs a relational table projection from the respective set of blocks assigned.

Figure 7:
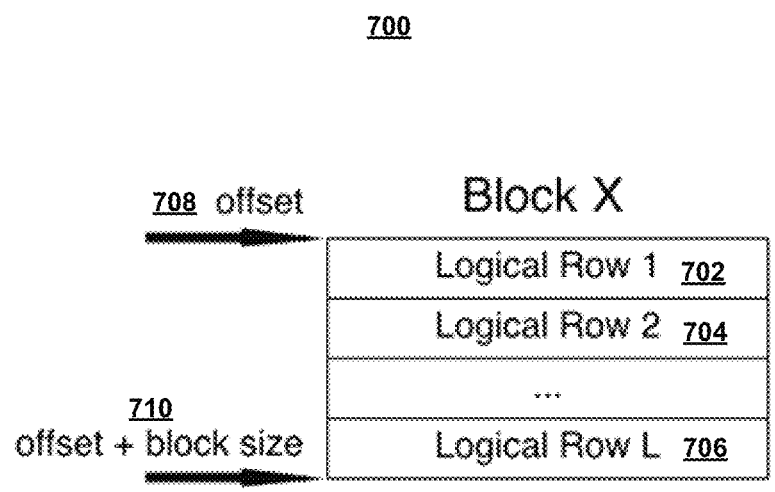
FIG. 7 is a block diagram of a block of data operable for various embodiments of the disclosure.

With reference to FIG. 7 a block diagram of a block of data operable for various embodiments of the disclosure is presented. Block 700 is an example of a block of data separated from a file during assignment to blocks 616 of FIG. 6.

The structure of block 700 consists of a subset of logical rows from the original file, for example file 602 of FIG. 6. A block begins at a particular offset from the origin of the file, offset 708, and ends at a sum of the particular offset plus the block size used, offset plus the block size 710. Block allocation does not take into account the logical representation of the rows, such as row 702, row 704 through row 706. The rows may fit evenly within a block, such as block 700 due to a combination of block size and number of data bytes. As a result of partitioning a likely result is a first row and/or last row contained within block created will be a row fragment. Each reader is responsible for taking row fragments in assigned blocks and constructing a full row.

A reader resolves row fragmentation by determining whether a first logical row in the block is being read, and if so going back to the end of the previous block and determining whether that previous block ends by the record separator. For example, for the CSV (comma-separated values) records, the record separator is a line separator. For some other record type, the particular record separator can be defined as another record separator.

When the previous block ends by the record separator, then the first record is the first full record in the current block. Begin reading that first row from that position; otherwise, skip this partial record (since the partial record was already read by the reader of the previous block) and start with the next record. When this record is the last record in the block and the record does not end on the record separator (the record "spills" over the current block into the next block), retrieve the remains of the row from the beginning of the next block. This technique ensures the readers in aggregate read all logical rows in the set of blocks as partitioned above. Further, a choice of block sizes, and allocation of blocks to readers, is not dependent on data contained within the blocks. When all blocks have been resolved a coordinator aggregates the result sets returned by all of the readers to form a set of result sets.

Figure 8:
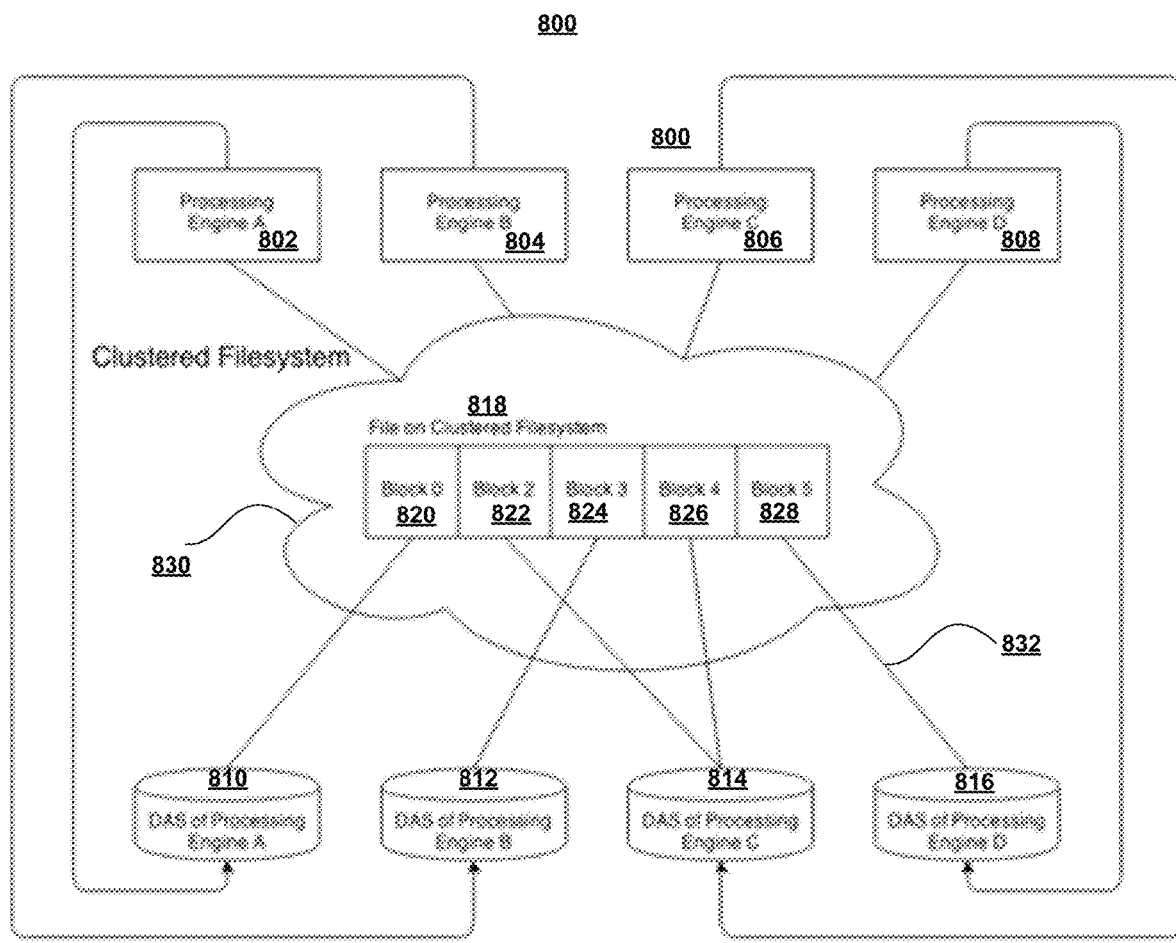
FIG. 8 is a block diagram of a clustered file system operable for various embodiments of the disclosure.

With reference to FIG. 8 a block diagram of a clustered file system operable for various embodiments of the disclosure is presented. Clustered file system 800 is an example of a file system providing optimal access to files when a block is local.

DFS in the example is assumed to be a POSIX® (a registered Trademark of The IEEE) compatible clustered file system embodied as clustered file system 800, running on commodity hardware, for example, Direct Attached Storage (DAS), in this example DAS 810-816 and providing a cluster wide view of file system behavior. In addition, these clustered file systems are organized to store byte ranges in 'blocks,' as in blocks 820-828, with each block locally accessible by a particular compute node, as in PE 802-808. Clustered file system 800 is also presumed to externalize locality information of the file 818 accessible through network 830 using any of links 832. In particular, the location of a compute node owning a particular data block is externalized.

Access to the particular block is possible from any node in the cluster; however, performance is optimal when the particular data block is accessed locally. In the example, Processing Engine 806 accesses blocks on its own DAS (for example, block 822 and block 826) the fastest, and therefore these blocks should be assigned to Processing Engine 806.

Figure 9:
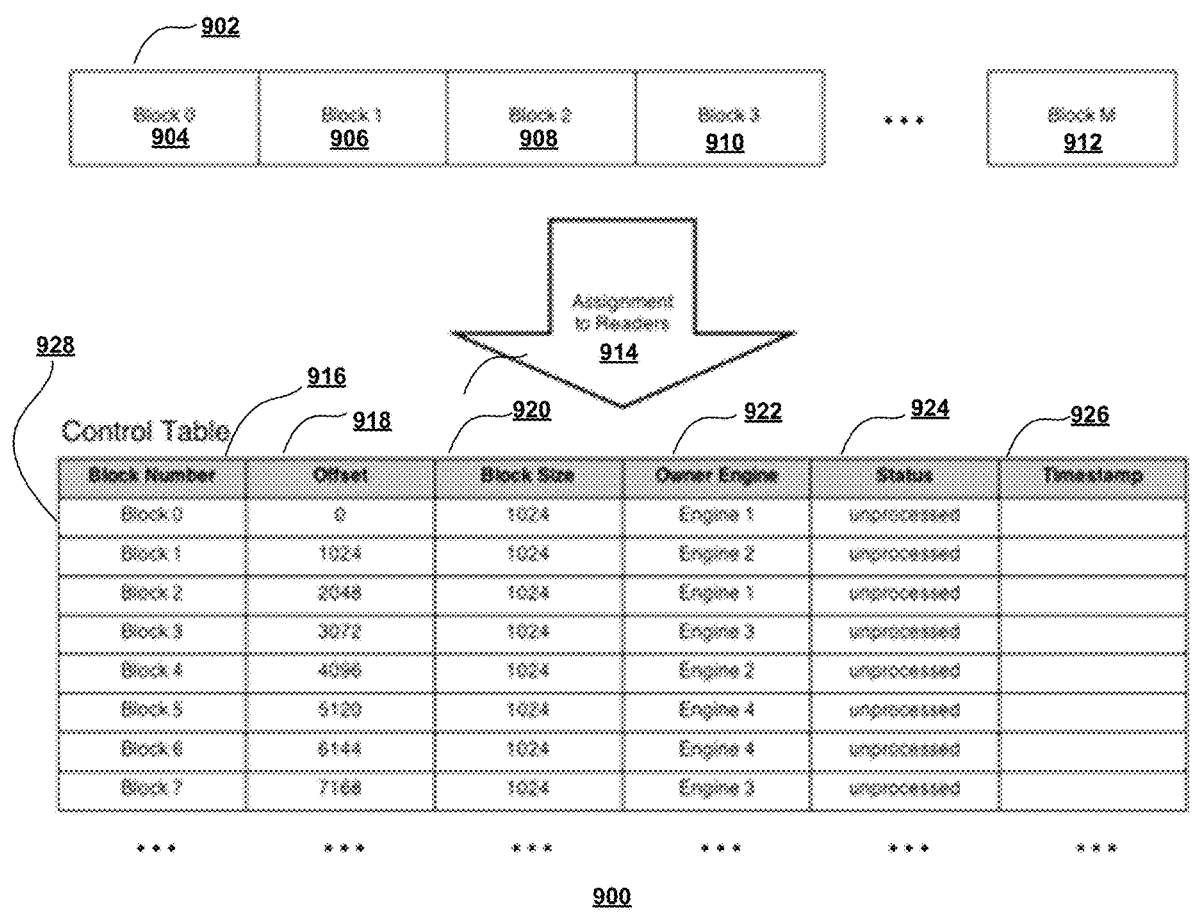
FIG. 9 is a block diagram of a control table operable for various embodiments of the disclosure.

With reference to FIG. 9 a block diagram of a control table operable for various embodiments of the disclosure is presented. Control table 900 is an example of a data structure used to manage correspondence between reading engines and associated blocks and processing status of each processing engine.

Two-phase processing of the input files includes a Phase 1 consisting of a static initial assignment of blocks, such as set of blocks 902 comprising blocks 904-912 to readers done according to a defined heuristic, for example, assignment to readers 914 as described in table 900. The heuristic relies on locality information as derived from DFS metadata, to enable blocks local to the reading engines are assigned to a corresponding associated reading engine. Since access to the file is shared amongst all reading engines, other heuristics are possible, including a heuristic that relies on a relative effective processing power of individual engines.

A single coordinator node, for example, coordinator 402 of FIG. 4, can execute Phase 1. Phase 1 can be performed in a distributed, symmetric fashion on all nodes rather than a single node, but given Phase 1 occurs exactly once, implementation may be more straightforward with a single defined coordinator node. For example, the first PE that obtained and secured access to the input file.

The coordinator node provides a capability of recording block assignments to control table 900. Control table 900 can reside either in the shared file system or as a relational table in a host relational database system. In either case control table 900 is accessible to all PE readers, and allows locking on an entire object (control table) or on subsets (rows) of the object. Further, concurrent read access to the object is allowed.

By way of example, a schema for control table 900 is defined. A header row of control table 900 indicates a set of control parameters for each block comprising a block number, an offset, a block size, an owner engine, a status (processing) and a timestamp. Control table 900 has a row 928, per block, and for each block control table 900 tracks to which particular engine the block is mapped, respective boundaries of the block, a processing state of the block, and a last change timestamp.

The set of parameters are defined as Block Number, comprising an integer, between 0 and the number of blocks minus one, that uniquely identifies the respective block; Offset, recording a value of the byte offset of the beginning of the respective block, which specifies the location of the respective block. The value is an integer between 0 and the byte size of the file minus last block size; Block Size is a value indicating the size of the respective block, in conjunction with the offset specifying the respective block boundaries. It is an integer between 0 and the file size; Owner Engine specifies the reader or processing engine in charge of processing this block; Status indicates a current processing state of the respective block. The status can be "unprocessed" for blocks that are pending processing, "in progress" for blocks that are currently being processed, and "completed" for blocks that are finished processing; Timestamp indicates a time the respective block began processing, and is used as a metric to gauge performance of the processing engines. A "Breathing" point flag may be present to indicate, when set, that a processing engine must stop at this point to re-fragment a block and re-assign previously assigned parts to all available processing engines using a round robin algorithm (typically a default) or a selected predefined more complicated algorithm.

Additional columns containing various run time information may be added to the table to extend the available attributes and information describing attributes. For example, storing runtime statistics for previously processed blocks on specific nodes, various performance indicators, comprising network bandwidth, IO throughput, and IO latency, and measured elapsed times, could be used later to tune performance and reduce total time of processing large unstructured files for a cluster.

Phase 2 begins once control table 900 has been constructed. Phase 2 has readers accessing control table 900. The readers search control table 900 for a row currently assigned to the respective reader, change the state of the row from "unprocessed" to "in progress", and update the timestamp.

Eventually, as the blocks are exhausted, a reader will own no rows (no blocks assigned to this reader remain unprocessed). In this event, the reader scans the entire set of blocks available, and dynamically re-assigns an available block from another owning reader to 'this' owning reader. The dynamic re-assignment procedure selects a row using a predefined heuristic and changes the assignment from the previous row owner to that of the reader. When no rows are available, the reader completes processing and returns an end of file indication to the coordinator to indicate completion of processing. An example heuristic may be, without limitation, (assuming all blocks are visible) to select (next block after processing all initially assigned blocks) a block from a partition with the most blocks remaining unprocessed and when multiple partitions remain with the same number of blocks remaining unprocessed, select the block closest to the selecting reader to exploit a processing efficiency using locality of reference. In another example, a predefined heuristic may be the processing power, or throughput of each processing engine in the set of processing engines available.

In environments where control table 900 is maintained in the host relational database system, typical relational table locking semantics apply. For example, obtain read-only locks on all rows visited, and obtain exclusive read-write locks on rows to be updated.

Dynamic re-assignment of blocks to readers can also be performed using workload and runtime statistics for previously processed blocks. During re-assignment heuristics may also be used to assign more blocks to less busy nodes in a cluster and fewer blocks to slower nodes.

In this example of an embodiment the block sizes are defined to be equal. However, it is possible to re-fragment blocks. To fragment a block means to partition a block of size N into M blocks, each of size N/M. In this case a block size is added as a column to control table 900. The purpose of re-fragmentation is to reduce data skew; or in other words, to ensure that as the number of blocks becomes small relative to the number of processing engines, work in the form of blocks available is distributed more evenly among processing engines. More will be discussed on the block re-fragmentation process later.

In the current example, only whole unprocessed blocks are dynamically re-assigned and re-fragmented. However, one or more processing engines may process assigned blocks less efficiently than other processing engines. When no more blocks are available for one or more idle processing engines, one or more processing engines will not be utilized and the overall job will be pending until the last processing engines finishes processing the last block. To provide better performance and more uniform block processing between multiple processing engines an in-flight block re-assignment and re-fragmentation solution is proposed, which is further described in the following section.

Figure 10:
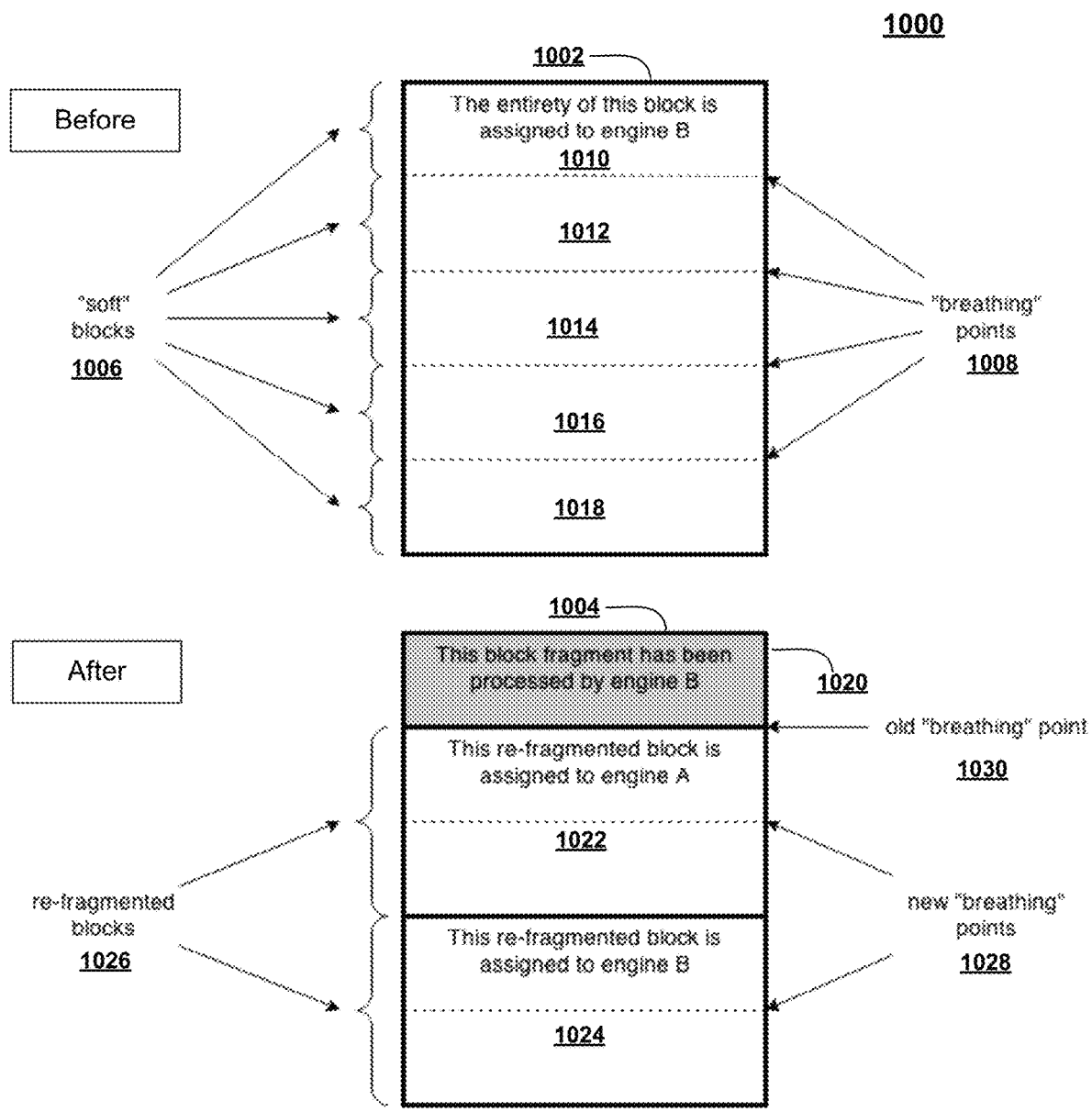
FIG. 10 is a block diagram of in-flight block re-assignment and re-fragmentation operable for various embodiments of the disclosure.

With reference to FIG. 10 a block diagram of in-flight block re-assignment and re-fragmentation operable for various embodiments of the disclosure is presented. In-flight 1000 provides an example of data structure changes as a result of an "in-flight" block re-assignment and re-fragmentation. The example of in-flight 1000 provides a view of block 1002 before re-fragmentation view and the view as block 1004 after re-fragmentation view of block 1002 as newly fragmented.

In-flight 1000 defines an additional column in control table 900 of FIG. 9. This additional column is a Boolean value containing a breathing point flag. In addition, the readers are further enhanced to periodically pause reading and check this added breathing point flag for the status of a block being processed. The additional pause and check operation is referred to as a breathing point for the respective reader. The Boolean value of breathing point flag indicates the processing engine must stop at this point, re-evaluate how to process the block further and, when required, to re-fragment a respective block and re-assign parts of the re-fragmented block to all available processing engines using a predefined distribution algorithm including round robin or other more complex algorithm as needed.

Block 1002 is currently assigned in entirety to processing engine B. A period, defining a periodic pause in reading and to check, is defined in terms of a size in bytes that is less than or equal to the size in bytes of the block. The subset of a block, in the example block 1002, is referred to as a soft block, shown as a set of soft blocks 1006. The soft block is only an internal value, greater than a predefined lower bound value (for example, 4 k) and is less than a size of the block being processed. The set of soft blocks 1006 comprises one or more segments of block 1002 defined as soft block 1010-1018, each of which is separated by a breathing point 1008. The same block 1002 after using the first "breathing" point (at the end of soft block 1010) is represented as block 1004. Re-fragmented blocks 1026 comprising block 1022 and block 1024 of smaller size than block 1002 are assigned to engines A and B together with a new set of "breathing" points 1028 and "soft" blocks. The old breathing point 1030 is in the same position as before however now it points to the end of the block 1020, a fragment processed by engine B.

Figure 11:
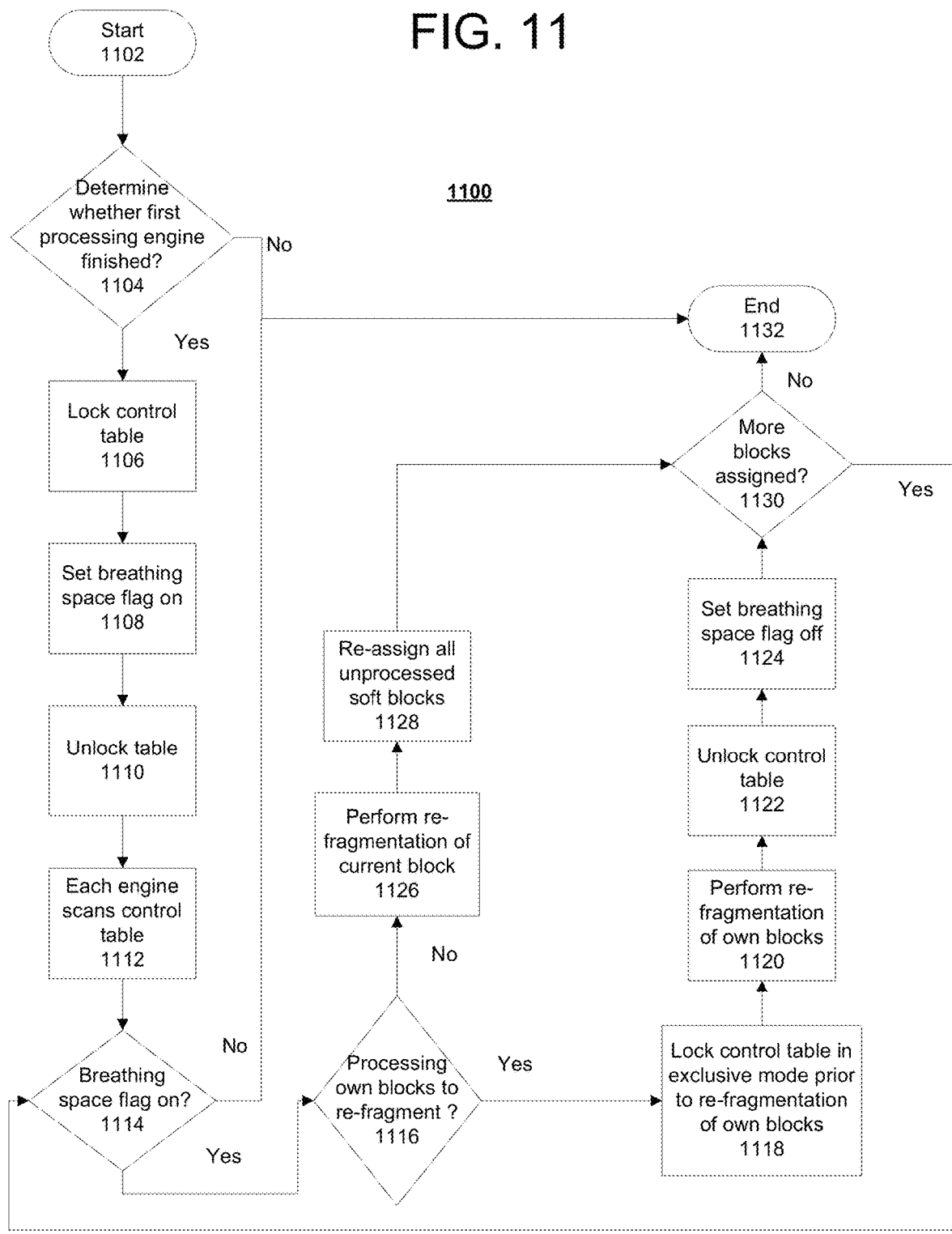
FIG. 11 is a block diagram of a process of setting a breathing point operable for various embodiments of the disclosure.

With reference to FIG. 11 a block diagram of a process of setting a breathing point operable for various embodiments of the disclosure is presented. Process 1100 is an example of a process using block re-assignment and re-fragmentation of FIG. 10.

Process 1100 begins and determines whether a first processing engine has finished a last assigned block or reached a lower bound of re-fragmentation for unassigned blocks (step 1102). For example, there are no more blocks available to be re-fragmented that have not currently completed processing or whose processing is in flight. In response to a determination (step 1104) this is the first processing engine, the first processing engine locks the control table (step 1106). The first processing engine sets the breathing point flag to true for each row being processed in a control table (step 1108). After setting the breathing point flags the first processing engine releases the lock on the table (step 1110).

As each reader scans the control table (step 1112), past a respective breathing point, the reader determines whether the breathing point flag is set (step 1114). In response to the detection, the reader determines whether blocks owned are to be re-fragmented (step 1116). In response to a determination the blocks owned are not to be re-fragmented the respective reader is responsible for re-fragmenting the current block in process (step 1126). All unread (unprocessed) soft blocks are re-assigned (step 1128). A typical predetermined algorithm, for example, a round robin or similar algorithm, is used to provide substantially equal block assignments between readers. Note that blocks can be re-assigned using more complex algorithms that take into account additional run time information about performance of individual engines that is collected and stored in the control or a separate table.

In response to a determination the blocks owned are to be re-fragmented, the reader, which reassigns its own rows, locks the table in the exclusive mode prior (step 1118). The reader performs a re-fragmentation of its own blocks (step 1120). The reader unlocks the control table when re-assignment of the blocks is complete (step 1122). The breathing point flag is unset for all such blocks so the blocks can be processed after the lock is released (step 1124). All other readers continue to scan the table. A determination made as to whether there are no more rows assigned to each respective reader, all blocks are either being read or have been read or all blocks being processed have reached a predetermined minimal block size (step 1130).

Readers continue to loop until a possibility of blocks being assigned no longer exists. This condition occurs when all blocks have either been processed or block processing is in-flight, and the size of the block being processed in-flight is of the size of the soft-block value. In response to a determination there are no more rows assigned to a respective reader, the reader exits from scanning with an end-of-file (EOF) indication (step 1132) with process 1100 terminating thereafter. The reader knows therefore no blocks can potentially be assigned. Phase 2 ends for an individual reader when there are no more blocks in an unassigned state globally. At that point, the processing tasks of the reader are complete. Ultimately, a processing request completes once all readers have completed their task.

Generally, to improve throughput of file scanning, large blocks are desired. However, the desire for large blocks is balanced with a need to evenly distribute processing amongst nodes (for example, to reduce skew). Processing time for an individual block typically becomes longer as the block size becomes larger, even though overall elapsed time for processing is lessened for a given amount of input data.

In systems with N readers, blocks are typically processed asynchronously with respect to each other. As the number of blocks remaining to be processed becomes less than the number of readers, some readers, which have no blocks, will complete their respect work in Phase 2. However, overall processing elapsed time is determined (lower bound) by the last reader to complete the processing of a respective block, and again when the block size is large, this processing elapsed time can be large. Another view of this problem is the processing becomes unbalanced across the readers as the number of blocks remaining globally becomes small.

With reference to FIG. 12 a block diagram of block fragmentation operable for various embodiments of the disclosure is presented. Block fragmentation 1200 provides an example of a control data structure change as a result of block fragmentation. The example of block fragmentation 1200 provides a view of a control table change in a before fragmentation table 1202 and after re-fragmentation view table 1206 as newly fragmented.

To balance processing, fragmentation 1204 is used when the number of blocks becomes small relative to the number of readers/processing engines. For an individual reader, when there are no blocks left in the control table 1002 for assignment, the individual reader prevents any other readers from changing state in control table 1202, for example, via a lock table or a lock file process. The reader proceeds to fragment all unassigned blocks in control table 1202.

Fragmentation process 1200 creates more blocks by subdividing the existing blocks into several smaller blocks, without changing the assignment. Row 1208 containing block 2 is fragmented in this example causing a reduction in the block size from 1024 bytes to 256 bytes.

Once block 2 of row 1208 is fragmented, a set of fragmented blocks in rows 1210 is inserted into the control table, as in control table 1206. Each of the inserted blocks has a new identifier of N+1, N+2 and N+3 in the set of fragmented blocks in rows 1210, a new block size of 256 bytes and a respective offset from the end of the newly sized block 2 (originally from row 1208). Note processing engine 1 which was originally assigned block 2 is also assigned the set of fragmented blocks in rows 1210. The general algorithm continues until there is no need to fragment further (typically due to block size, or a predetermined limit of resize operations). The fragmented blocks N+1, N+2 and N+3 behave in exactly the same way as original block 2, except the fragmented blocks are smaller. The fragmented blocks are available for the general algorithm to select for processing.

Typically a simplest (and least cost) implementation of re-fragmentation of blocks uses the described procedure only one time (or just a few times) because there is a lower bound on the effectiveness of the fragmentation process. Collecting runtime statistics for processed blocks and performing a cost benefit analysis can roughly estimate the lower bound. In the examples disclosed, a limit of the number of times to re-fragment is set to one time.

As a further improvement of process 1200, information from the control file can be utilized to assess the performance of individual processing engines. From the values of timestamp, block size and number of blocks processed by an engine, an effective processing rate of the respective engine can be calculated. Furthermore, from that calculated metric the time a particular engine requires to process a block can be predicted. Therefore when the blocks have been fragmented to a predefined limit and a comparatively slow engine determines not many blocks remain, an optimal solution for the slow engine may be to return rather than process. Other engines can then process the remaining few blocks. This example is an improvement in the event it would take longer for the slow engine to process a block than for a faster engine to finish processing its current block and to then process the block the slow engine was considering.

More advanced strategies that use runtime statistics and workload based performance indicators can be devised for dynamically re-fragmenting the blocks within the current approach to benefit more from parallel processing of large unstructured data.

Figure 13:
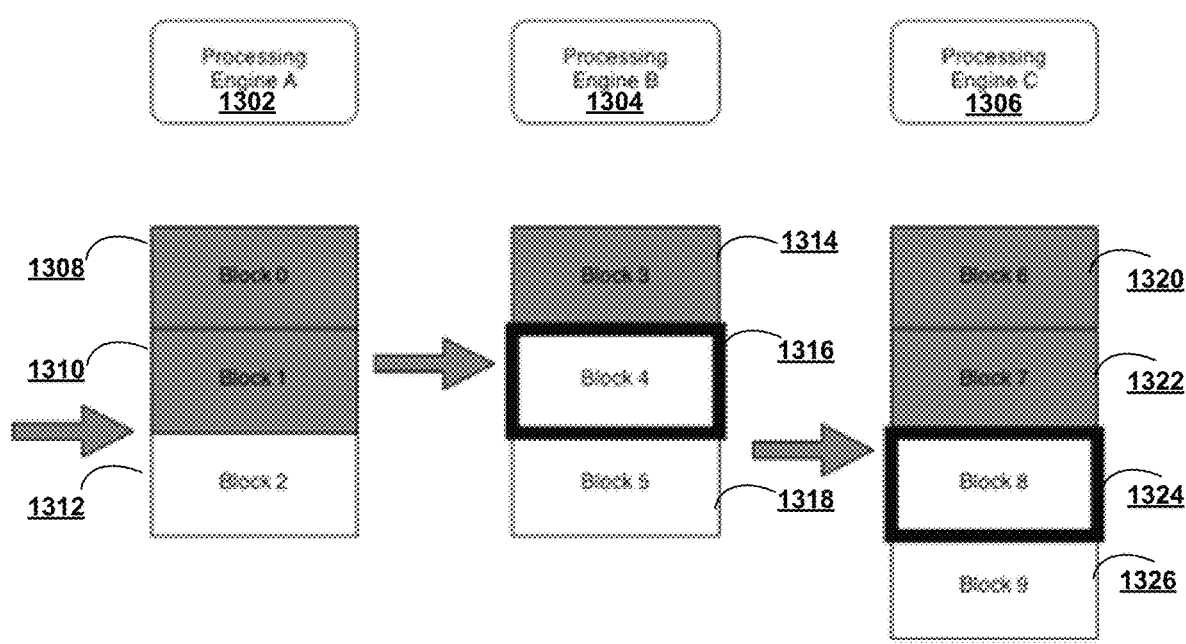
FIG. 13 is a block diagram of a favorable fragmentation situation operable for various embodiments of the disclosure.

With reference to FIG. 13 a block diagram of a favorable fragmentation situation operable for various embodiments of the disclosure is presented. Example 1300 is a situation in which the conditions for fragmentation are satisfied.

A typical benefit of block fragmentation near-end-of-job is an avoidance of a database engine taking a long time to finish processing a block when other engines in the cluster that are finished with their respective workload could take some of the workload from the database engine taking a long time to finish. In current example, the situation satisfies the conditions for fragmentation. The condition satisfied in example 1300 is the number of unprocessed blocks, Block 2 1312, Block 5 1318 and Block 9 1326 is less than or equal to the number of processing engines (e.g., processing engine 1302, processing engine 1304, and processing engine 1306). Block 0 1308, Block 1 1310, Block 3 1314, Block 6 1320 and Block 7 1322 represent blocks for which processing has completed. Block 4 1316 and Block 8 1324 represent blocks for which processing is in progress. Processing engine 1302 locks a Control File, and fragments Block 2 1312, Block 5 1318, and Block 9 1326. Block 2 is fragmented into a corresponding Block 2 of half the size and a Block 10, Block 5 into a corresponding Block 5 and Block 11, and Block 9 into a corresponding Block 9 and Block 12 (as in FIG. 15). The fragments just created retain the same Owner Engine as the original block from which the fragments came. The blocks are processed using a typical heuristic as described previously, possibly being dynamically reassigned in the process.

Figure 14:
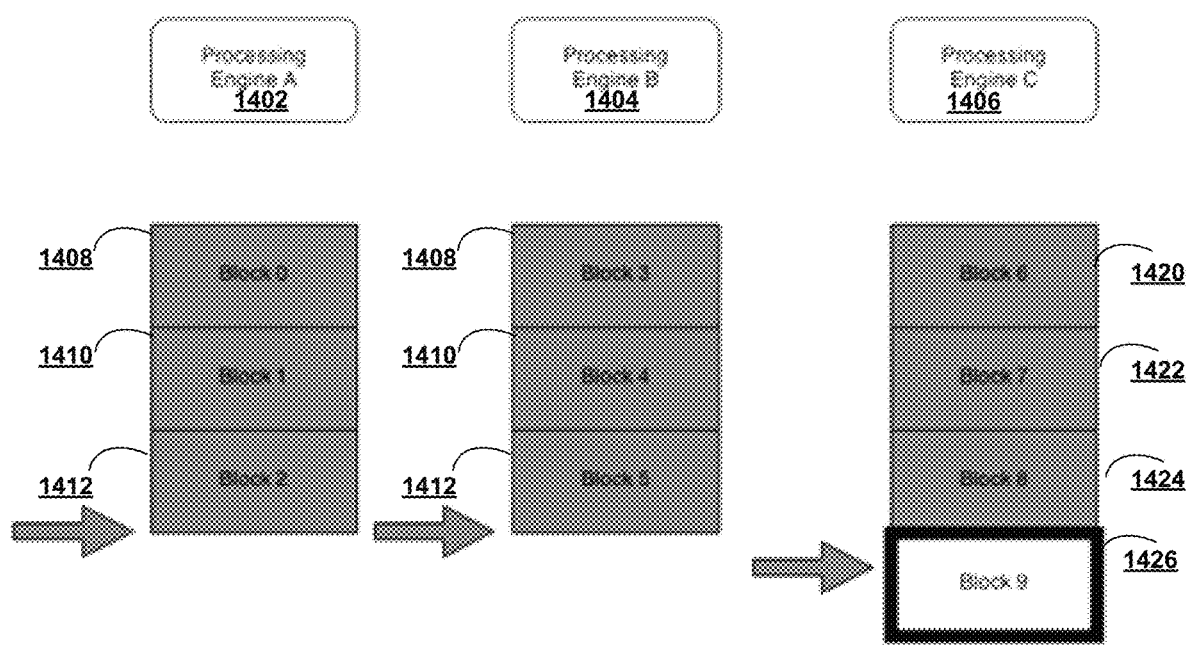
FIG. 14 is a block diagram of an unfavorable fragmentation situation operable for various embodiments of the disclosure.

With reference to FIG. 14 a block diagram of an unfavorable fragmentation situation operable for various embodiments of the disclosure is presented. Example 1400 depicts an example in which the conditions for fragmentation are not satisfied.

Situations in which processing engine 1402, processing engine 1404, are idle and processing engine 1406 is taking a long time to finish processing Block 9 1426. Processing engine 1402 has completed processing of Block 0 1408, Block 1 1410, and Block 2 1412, and processing engine 1404 has completed processing of Block 3 1414, Block 4 1416, and Block 5 1418, could take some of the workload from processing engine 1406. In current example, the situation does not satisfy conditions for fragmentation because processing engine 1406 has completed processing of Block 6 1420, Block 7 1422, and Block 8 1424 while Block 9 1426 remains in progress and processing engine 1402, and processing engine 1404, are idle.

The condition not satisfied in example 1400 is the number of unprocessed blocks, is less than or equal to the number of processing engines (e.g., processing engine 1402, processing engine 1404, and processing engine 1406). In this situation the number of unprocessed blocks is zero, and all blocks are processed other than Block 9 1426. Block 0 1408, Block 1 1410, Block 2 1412, Block 3 1414, Block 4 1416, Block 5 1418, Block 6 1420, Block 7 1422 and Block 8 1424 represent blocks for which processing has completed. Block 9 1426 represents a block for which processing is in progress.

Figure 15:
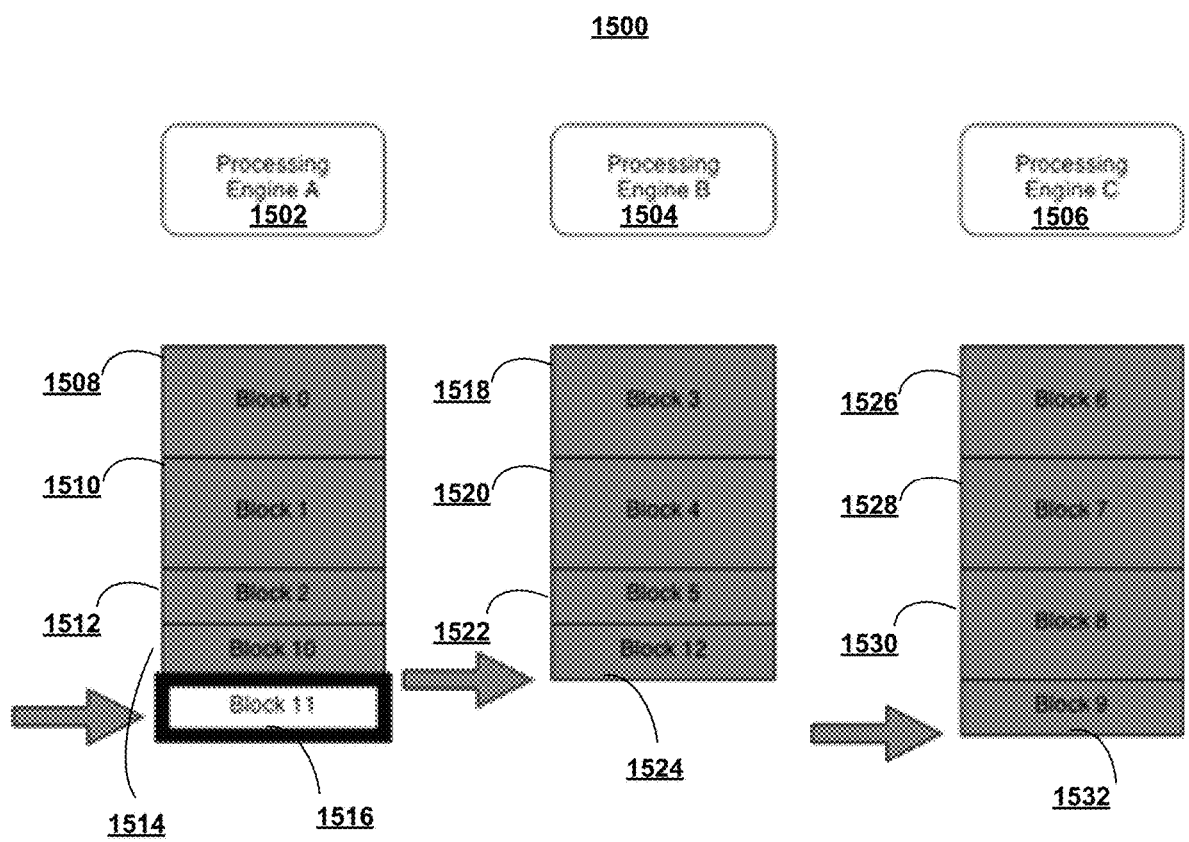
FIG. 15 is a block diagram of a favorable fragmentation situation operable for various embodiments of the disclosure.

With reference to FIG. 15 a block diagram of a favorable fragmentation situation operable for various embodiments of the disclosure is presented. Example 1500 depicts an improvement over the favorable fragmentation situation of FIG. 13 in which a more optimal situation for fragmentation occurs.

In this example, the situation also satisfies the conditions for fragmentation. The condition satisfied in example 1500 is the number of unprocessed blocks, is zero which is less than or equal to the number of processing engines. Processing engine 1502 has completed processing of Block 0 1508, Block 1 1510, Block 2 1512, Block 10 1514. Processing engine 1504 has completed processing of Block 3 1518, Block 4 1520, Block 5 1522 and Block 12 1524. Processing engine 1506 has completed processing of Block 6 1526, Block 7 1528, Block 8 1530 and Block 9 1532. Block 11 1516 represents a block for which processing is in progress. Because of the fragmentation as shown previously in FIG. 13, original Block 2 was fragmented into a corresponding Block 2 of half the size and a Block 10, Block 5 was fragmented into a corresponding Block 5 and Block 11, and Block 9 was fragmented into a corresponding Block 9 and Block 12. However in this case, when the number of unprocessed blocks was less than or equal to the number of processing engines the blocks have been divided by two. The fragments were dynamically reallocated so that the processing engines were processing the fragments at the same time.

A more mathematical defense of the fragmentation process is provided. Assume there are N processing engines and there are M blocks. Each processing engine is assigned $M/N \pm 1$ blocks to process. The processing time to process a block is represented by t, then the time until a processing engine is finished processing all blocks assigned to it is expressed as $(M/N \pm 1)t$.

When all blocks are in state in progress or completed, some processing engines will be idle, and some engines will still be processing. This allocation of processing engines is sub-optimal, because less computing power of the cluster is applied to processing blocks than is possible. A worst-case scenario occurs when all processing engines but one complete processing at time X, and the last processing engine starts processing the last block at the same time. Hence the total time to process the input file is X+t.

Assuming the same situation, but when the number of unprocessed blocks was less than or equal to the number of processing engines the blocks have been divided by two (fragmented into smaller sizes). At time X, only N−2 processing engines will be idling, and the fragments are dynamically reallocated so that processing engines are processing the fragments at the same. This re-fragmentation ensures a worst-case scenario for processing time is X+t/2 rather than X+t.

A proof for fragmenting into more than two parts follows the same argument. In fact, when the idea approaches a limit (number of divisions→∞, block size→0), clearly all nodes will finish at the same time. This would be optimal if not for the fact that a block of size S will be processed faster than two blocks of size S/2, due to per-block overheads. So the optimal solution is to strike a balance between big block sizes (through initial allocation and later re-fragmentation and reassigning) and ensuring that there are no idle processing engines.

Thus is presented in an illustrative embodiment an apparatus for parallel processing of files on a distributed file system. The apparatus comprises a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric. The processor unit executes the computer executable program code to direct the apparatus to partition the file by a single coordinator of data scanning and processing services into a set of predetermined sized blocks, in response to a request to process as input a file stored on a distributed file system, and assign one or more blocks in the set of predetermined sized blocks by the single coordinator to a reader in a set of readers.

The processor unit executes the computer executable program code to further direct the apparatus to record block assignments by the coordinator to a control table accessible to all readers and to direct the set of readers to search the control table for a row currently assigned to a respective reader by accessing the control table.

The processor unit executes the computer executable program code to further direct the apparatus, in response to locating the row currently assigned to the respective reader, to change a state of the row to in progress, and to update a timestamp associated with the row in the control table by the respective reader. In response to a determination all blocks currently assigned to the respective reader are exhausted, the processor unit executes the computer executable program code to further direct the reader of the apparatus to scan the control table for a set of the blocks available, and to dynamically re-assign an available block by the reader from another owning reader to the respective reader using a set of predefined heuristics and to change the row owner to the respective reader. In response to a determination no rows are available, the processor unit executes the computer executable program code to further direct the respective reader of the apparatus to complete processing and return an end of file indication to the single coordinator.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for parallel processing of files on a distributed file system, comprising:
    in response to a request to process as input a file stored on a distributed file system, a single coordinator of data scanning and processing services partitioning, using a processor, the file into a set of predetermined sized blocks;
    assigning, using the processor, one or more blocks in the set of predetermined sized blocks by the single coordinator to a reader in a set of readers;
    recording, using the processor, block assignments by the coordinator to a control table accessible to all readers;
    accessing, using the processor, the control table by the set of readers to search the control table for a row currently assigned to a respective reader;
    in response to locating the row currently assigned to the respective reader, the respective reader changing a state of the row to "in progress", and updating a timestamp associated with the row in the control table using the processor;
    in response to a determination all blocks currently assigned to the respective reader are exhausted, the reader, using the processor, scanning the control table for a set of the blocks available, and dynamically re-assigning an available block from another owning reader to the respective reader using a set of predefined heuristics and changing the row owner to the respective reader; and
    in response to a determination no rows are available, the respective reader completes processing and returns an end of file indication to the single coordinator, wherein
    dynamically re-assigning an available block from another owning reader to the respective reader further comprises:
        locking the control table by a reader, to prevent any other readers from changing state in the control table, wherein
            a number of unprocessed blocks, is less than or equal to a number of processing engines;
        fragmenting one or more blocks by subdividing existing unprocessed blocks into several smaller blocks, without changing a current assignment, wherein
            the fragmenting causes a reduction in size of each block fragmented and a fragment block less than a current size of each the one or more blocks to create a set of fragmented blocks;
        inserting entries for the set of fragmented blocks in rows inserted into the control table, wherein
            each of the inserted entries includes a new identifier, a new block size in bytes and a respective offset from an end of a newly sized original block and wherein the fragmented blocks just created retain a same owner engine as an original block from which the fragment blocks came; and
        unlocking the control table.

2. The method of claim 1, wherein
the partitioning the file into a set of predetermined sized blocks further comprises:
partitioning the file into substantially similar sized blocks of a number of bytes, wherein
when the file is not an exact multiple of a block size, a last block partitioned is smaller by a predetermined amount and remaining blocks are of equal size.

3. The method of claim 1, wherein
the single coordinator is one of:
a first reader that obtained and secured access to the file as input; and
a predetermined coordinator.

4. The method of claim 1, wherein
the assigning one or more blocks in the set of predetermined sized blocks by the single coordinator to a reader in a set of readers is according to a set of heuristics comprising at least a locality information heuristic, wherein
blocks local to the reader are assigned to the reader, wherein
the union of the set of all blocks of all readers is equal to a set of all blocks that constitute the file, wherein
the blocks do not overlap enabling data in each block of the file to be seen exactly once, by exactly one reader.

5. The method of claim 1, wherein
recording block assignments by the single coordinator to a control table accessible to all readers, further comprises:
wherein the control table enables locking on an entire object or on subsets of the object and wherein concurrent read access to the object is allowed;
wherein the control table is a data structure having one row per block of the file being processed, each row comprising control values for a respective block, comprising an identifier of the respective block;
an offset of the beginning of the respective block to identify a location of the respective block;
a block size for the respective block;
an owner engine indicating which reader is assigned the respective block, a status value indicating a block processing state as one of in progress, unprocessed, and completed;
a timestamp containing a start time at which the respective block began being processed and a breathing point flag indicating, when set, a respective reader is to pause to perform a re-fragment or re-assign associated with the respective block.

6. The method of claim 1, wherein
partitioning the file into a set of predetermined sized blocks further comprises:

partitioning the file to generate initial block splits for large files without a sampling of network traffic within a cluster or a preliminary step of measuring network performance including bandwidth, and I/O latency.

* * * * *